US012735547B2

(12) United States Patent
Andreasson

(10) Patent No.: US 12,735,547 B2
(45) Date of Patent: Sep. 15, 2026

(54) PROCESS OF RECYCLED POLYPROPYLENE

(71) Applicant: Nexam Chemical AB, Lomma (SE)

(72) Inventor: Urban Andreasson, Stenungsund (SE)

(73) Assignee: Nexam Chemical AB, Lomma (SE)

( * ) Notice: Subject to any disclaimer, the term of this patent is extended or adjusted under 35 U.S.C. 154(b) by 546 days.

(21) Appl. No.: 18/553,995

(22) PCT Filed: Apr. 5, 2022

(86) PCT No.: PCT/EP2022/058988
§ 371 (c)(1),
(2) Date: Oct. 5, 2023

(87) PCT Pub. No.: WO2022/214473
PCT Pub. Date: Oct. 13, 2022

(65) Prior Publication Data

US 2024/0182662 A1 Jun. 6, 2024

(30) Foreign Application Priority Data

Apr. 6, 2021 (SE) .................................... 2150424-6

(51) Int. Cl.
*C08J 11/06* (2006.01)

(52) U.S. Cl.
CPC ............ *C08J 11/06* (2013.01); *C08J 2323/12* (2013.01); *C08J 2423/08* (2013.01)

(58) Field of Classification Search
USPC ........................................................... 521/47
See application file for complete search history.

(56) References Cited

U.S. PATENT DOCUMENTS

2005/0014902 A1 1/2005 McMahon et al.
2010/0267900 A1* 10/2010 Gahleitner .............. C08L 23/04 525/209
2011/0015330 A1* 1/2011 Machl ..................... C08L 21/00 524/451
2020/0095360 A1 3/2020 Wang

FOREIGN PATENT DOCUMENTS

EP 2582743 A1 4/2013
EP 2582743 B1 * 4/2014 .............. C08J 3/226
EP 3339366 A1 * 6/2018 .............. C08L 23/26
EP 3409701 A1 * 12/2018 ............ C08L 51/003
JP H0586207 A 4/1993
JP 2020521832 A 7/2020
WO 2011/160964 A1 12/2011
WO 2012117250 A1 9/2012
WO 2018220024 A1 12/2018
WO WO-2020263739 A1 * 12/2020 ............... C08K 5/42

OTHER PUBLICATIONS

International Search Report and Written Opinion mailed Jul. 5, 2022, for International Patent Application No. PCT/EP2022/058988.
Ahmed Issa et al.; Kinetics of Alkoxysilanes and Organoalkoxysilanes Polymerization: A Review; Polymers; Mar. 21, 2019; pp. 1-41; vol. 11, No. 3.

* cited by examiner

*Primary Examiner* — Terressa Boykin
(74) *Attorney, Agent, or Firm* — Renner, Otto, Boisselle & Sklar, LLP

(57) ABSTRACT

Improve properties of recycled post-consumer and/or post-industrial polypropylene by adding ethylene copolymer (B) comprising hydrolysable silicon-containing groups.

13 Claims, No Drawings

PROCESS OF RECYCLED POLYPROPYLENE

This application is a national phase of International Application No. PCT/EP2022/058988 filed Apr. 5, 2022, which claims priority to Swedish Application No. 2150424-6 filed Apr. 6, 2021, each of which is hereby incorporated herein by reference in its entirety.

TECHNICAL FIELD

The present invention relates to a process for recycling post-consumer and/or post-industrial polypropylene.

BACKGROUND

Recycling of waste products has become increasingly common practice in the last decades. The recycling of plastic materials is important and widely carried out by many industries and households around the world. A multitude of everyday consumer items are made from plastic materials, such as bottles, bags, and product packaging. It is important to recycle and reuse the polymers.

However, it is necessary to monitor and ensure the quality of the of the recycled plastics. An object of particular importance in recycling the polypropylene is to meet processability properties. Polypropylene is recycled from various processes. Recycled polypropylene has at least been used once. The reclaimed polypropylene originates from post-consumer and/or post-industrial uses. Most recycled plastics are mixed into a single stream which is collected and processed by a material recovery facility (MRF). At the MRF, materials are sorted, washed, granulated, and packaged for resale. Plastics can be sorted into individual materials, such as high-density polyethylene (HDPE) or poly (ethylene terephthalate) (PET), or mixed streams of other common plastics, such as polypropylene (PP), low-density polyethylene (LDPE), poly(vinyl chloride) (PVC), polystyrene (PS), polycarbonate (PC), and polyamides (PA). The single or mixed streams can then be further sorted, washed, and reprocessed into a pellet that is suitable for selected purposes.

Though recycled plastics are sorted into predominately uniform streams and are washed with aqueous and/or caustic solutions, the final reprocessed pellet remains contaminated with other plastic and with various properties. For example, there will always be small amount of polyethylene in the recycled polypropylene stream.

Since the properties of a recycled streams influence the usefulness of the recycled polypropylene will vary. One solution to this is to test the properties of every lot. This would be difficult, costly, and impractical. To ensure stable properties of the recycled polypropylene stream resilient solutions must be found that ensure the recycled polypropylene meets the specification for the application.

WO 2012/117250 A1 disclose a process for recycling polypropylene composition for food applications. However, there may still be a desire to modify the recycled polypropylene in order to achieve a more versatile and useful polypropylene product for certain uses.

US 2011/0015330 relates to a polyolefin composition comprising a virgin polyolefin base resin comprising an olefin homo- or copolymer (A) having hydrolysable silicon-containing groups, and an inorganic mineral filler (B) containing on its surface silanol groups or precursors thereof. Furthermore, US 2011/0015330 discloses combining an ethylene copolymer (B) comprising hydrolysable silicon-containing groups with a condensation catalyst.

SUMMARY

The invention relates to a method for producing a polypropylene composition (P) from recycled polypropylene. In particular, the invention relates to a method in order to provide a polypropylene composition (P) from recycled polypropylene having a lower melt flor rate ($MFR_2$) than the recycled polypropylene used as starting material for the polypropylene composition (P). The properties of recycled post-consumer and/or post-industrial polypropylene is improved by adding ethylene copolymer (B) comprising hydrolysable silicon-containing groups.

When polypropylene is recycled the $MFR_2$ is increased. This will make the recycled polypropylene less useful, because many applications require low $MFR_2$.

In industrial production of virgin polypropylene, the $MFR_2$ is controlled by the production parameters. Therefore, there is no need to change the $MFR_2$ of virgin polypropylene.

A purpose of this invention is to lower the $MFR_2$ of the recycled polypropylene composition (P).

The polypropylene products to be recycled are often reprocessed into a pellet that is suitable for selected purposes. Process streams from single or mixed sources of polypropylene products may be used for granulation. Granulated means that the plastic is compounded and pelletized. This will increase the $MFR_2$ of the plastic, commonly referred to degradation of the plastic. However, it has turned out that by introducing an ethylene copolymer (B) comprising hydrolysable silicon-containing groups the $MFR_2$ may be lowered during compounding. Such an ethylene copolymer (B) suitably used is for example disclosed in EP2582743 A1. Compounding is suitably done in a compounder wherein the polymer is mixed. Compounding is done in suitable extruders with efficient mixing. A suitable level of mixing is required to get a homogenous polymer melt and even polymer properties.

The recycled polypropylene of this invention is for example intended for various applications for example sheet and thermoforming, pipe, and blow moulding applications. All these applications require low $MFR_2$ of the recycled polypropylene composition (P).

In one application, the recycled polypropylene is extruded into a sheet, typical with a width of 300-2000 mm. The sheet is cut and formed by thermoforming into desired shapes. This process requires that the $MFR_2$ of the recycled polypropylene is low and controlled. The melt strength of the recycled polypropylene depends on the $MFR_2$ of the recycled polypropylene composition (P). When polypropylene is recycled chain scission occurs. The short chains formed by chain scission will increase the $MFR_2$ of the recycled polypropylene. This will impair the melt strength of the recycled polypropylene.

The $MFR_2$ for applications such as thermoforming and pipes typically are below 5 g/10 min. The recycled polypropylene can be used for other applications such as injection moulding. The $MFR_2$ is important for processability and mechanical strength of the final product.

In pipe applications melt strength is important for dimensional stability of the pipe. When pipes are extruded there is molten polymer inside the pipe walls. If the melt strength is low, the molten polymer will flow inside the pipe walls and the pipe will be thicker in the bottom part. To meet the mechanical properties of the pipe a low $MFR_2$ is required.

Hence, the invention relates to a process of recycling a polypropylene composition (P) from recycled polypropylene (A) and a copolymer (B) wherein the recycled polypropylene composition (P) comprises:

a) at least 50 weight % of recycled polypropylene (A), and
b) 0.5 to 15 weight % of an ethylene copolymer (B) comprising hydrolysable silicon-containing groups compounding said recycled polypropylene composition (P), wherein the recycled polypropylene composition (P) treated by 0.5 to 15 weight % of an ethylene copolymer (B) comprising hydrolysable silicon-containing groups has at least 15% lower $MFR_2$ compared to the recycled polypropylene (A).

It is an object of the invention to control the $MFR_2$ of the recycled polypropylene composition (P). The recycled polypropylene (A) can be obtained from various processes of recycling. An example of such process is reclaimed polypropylene that can be obtained from post-consumer recycling or post-industrial recycling. The physical properties of recycled polypropylene depend on the source. It is thus an object of the invention to provide an efficient, simple, and reliable control of the $MFR_2$ of the recycled polypropylene. The object is reached by adding a sufficient amount of an ethylene copolymer (B) comprising hydrolysable silicon-containing groups.

Compounding polypropylene and polyethylene is a well stablished technology. Thus, one advantage of the invention is that it can be implemented on present extrusion equipment.

The invention further relates to a recycled polypropylene composition (P) wherein the recycled polypropylene composition (P) comprises:

a) at least 50 weight % of recycled polypropylene (A), and
b) 0.5 to 15 weight % of an ethylene copolymer (B) comprising hydrolysable silicon-containing groups wherein said recycled polypropylene composition (P) is compounded and that the polypropylene composition (P) after compounding has a $MFR_2$ of 1 to 5 gram/10 min.

The invention also relates to the use of an ethylene copolymer (B) comprising hydrolysable silicon-containing groups as an $MFR_2$ modifier for recycled polypropylene composition (P) wherein the recycled polypropylene composition (P) comprises:

a) at least 50 weight % of recycled polypropylene (A), and
b) 0.5 to 15 weight % of an ethylene copolymer (B) comprising hydrolysable silicon-containing groups.

As used herein, the term "recycled polymer" refers to a polymer used for a previous purpose and then recovered for further processing.

As used herein, the term "recycled polypropylene" refers to polypropylene used for a previous purpose and then recovered for further processing. The recycled polypropylene must be sorted and aggregated into defined streams for recycling processes.

As used herein, the term "post-consumer" refers to a source of material that originates after the end consumer has used the material in a consumer good or product.

As used herein, the term "post-consumer recycle" (PCR) refers to a material that is produced after the end consumer has used the material and has disposed of the material in a waste stream.

As used herein, the term "post-industrial" refers to a source of a material that originates during the manufacture of a good or product.

As used herein, the term "recycled polypropylene" can be obtained from reclaimed polypropylene or from post-consumer recycle polypropylene or post-industrial polypropylene. And the recycled polypropylene becomes a raw material that is used in the production of new products.

Polypropylene has at least 50 weight % of propylene monomer.

DETAILED DESCRIPTION

In one embodiment the amount of recycled polypropylene (A) is at least 75 weight %, preferably at least 80 weight %, or most preferably 90 weight %.

In a preferable embodiment of the invention the $MFR_2$ of the recycled polypropylene is at least 20% lower compared to the recycled polypropylene (A), more suitable at least 30% lower.

The polypropylene composition (P) shall add up to 100%. The polypropylene composition (P) further can comprise additivities, pigments, and other polymer fractions. The polypropylene composition (P) can comprise pigment, suitably carbon black: This will increase the density of the recycled polypropylene composition (P). Additives are suitably added by masterbatches. If further polymer fractions are added into the recycled polypropylene composition (P) suitable virgin polypropylene or polyethylene is added. Most suitable no further polymer fraction is added.

In one embodiment the amount of a copolymer (B) comprising hydrolysable silicon-containing groups is from 1 to 10 weight %, more suitably 2 to 7 weight %. The amount of copolymer (B) is decided on the desired $MFR_2$ of the recycled polypropylene composition (P). The desired $MFR_2$ of the polypropylene composition (P) is decided by the end use of the recycled polypropylene composition (P). The $MFR_2$ of the recycled polypropylene composition (P) has suitably an $MFR_2$ of 1 to 10 gram/10 min, more suitably 1 to 5 gram/10 min and most suitably an $MFR_2$ of 1 to 3 gram/10 min. It is an objective of the invention to have a low amount of a copolymer (B) comprising hydrolysable silicon-containing groups. This will improve the compounding process. It will make it simpler, more stable and a more homogenous composition. The amount of hydrolysable silicon-containing groups in the polyethylene is from 0.1 to 5 weight %, more suitable 0.5 to 2 weight %.

In another embodiment of the invention the compounding temperature is above 200° C. The recycled polypropylene composition (P) is compounded with at least two zones in the compounder at a temperature of at least 200° C. In a more suitable embodiment of the invention at least two zones are 230° C. or above, even more suitable two zones 240° C. or above. The recycled polypropylene composition (P) is compounded with at least two zones in the compounder at a temperature of below 270° C., more suitable below 260° C. The residence time in compounding unit should at least be 1 minute or more.

The recycled polypropylene (A) can be obtained from post-consumer recycling. The recycled polypropylene (A) can be obtained from post-industrial recycling. In a suitable embodiment the recycled polypropylene (A) is from post-consumer recycling. This is more demanding process since the recycled polypropylene (A) is a mixture of various polypropylenes and contaminated from other mixed streams of other common plastics.

In another embodiment of the invention the ethylene copolymer (B) comprising hydrolysable silicon-containing groups is a low-density polyethylene (LDPE). The LDPE can be either recycled or virgin. Virgin means that the polymer has not been used. Due to the lack of recycled ethylene copolymer (B) comprising hydrolysable silicon-containing groups it is most suitable to use virgin sources. The LDPE is made in a high-pressure process. Another reason to use virgin ethylene copolymer (B) comprising hydrolysable silicon-containing groups is that the reactivity will decrease by use.

In another embodiment of the invention the copolymer (B) comprising hydrolysable silicon-containing groups is a polyethylene that is grafted. Polyethylene can be grafted with silane containing groups such as ethylene-vinyl silane, which is well known.

The invention is suitably free from peroxide and/or peroxide residues. The peroxide and/or peroxide residues can come from various steps in reactive compounding. Polypropylene can be reactive compounded with peroxide to increase the $MFR_2$. The peroxide will cut the polypropylene chains. As described above, the recycled polypropylene will usually comprise a minor fraction of polyethylene. The polyethylene may originate from the virgin polypropylene. Ethylene is commonly a comonomer in polypropylene, or polyethylene is added as an impact modifier in the polypropylene or originates from poor sorting of the recycled polypropylene.

In a preferred embodiment of the invention the entire process is free from peroxide or peroxide residues. The copolymer (B) comprising hydrolysable silicon-containing groups is suitably free from peroxide or peroxide residues. Meaning that the copolymer (B) comprising hydrolysable silicon-containing groups is a polyethylene, suitably a LDPE that is made in a high-pressure process.

In a preferred embodiment of the invention, the recycled polypropylene composition (P) is free from condensation catalyst. The purpose of a condensation catalyst is to cross-link the hydrolysable silicon-containing groups by a condensation reaction. It is however preferred to avoid condensation catalysts, since they are either harmful for the environment or involve strong acids.

It is an object of the invention that articles made from a recycled polypropylene composition (P) are substantially free of odour and comparable to articles made from virgin polypropylene in relation to smell and mechanical properties.

The polypropylene composition (P) after compounding has suitably a $MFR_2$ of 1 to 5 gram/10 min, more suitably a $MFR_2$ of 1 to 3 gram/10 min and most suitably a $MFR_2$ of 1 to 2 gram/10 min.

The properties of the recycled polypropylene vary. The variation of density of recycled polypropylene can be from 890 $kg/m^3$ to 990 $kg/m^3$. The colour can be any, but mostly black. The ash content is below 2 weight % and the recycled polypropylene composition (P) is mostly in the form of pellets or granules. The moisture content is below 0.1 weight %. Most properties of the recycled polypropylene composition (P) are the same as the recycled polypropylene.

The recycled polypropylene composition (P) is suitably used for the application of extruding a sheet and thermoforming said sheet.

The invention also refers to a process in which the recycled polypropylene composition (P) is additivated. Antioxidants are added in order to minimise degradation during processing and oxidation during the following use of the finished article. With respect to the invention, it is important to stress that the presence of antioxidants is important in order to minimize the degree if degradation leading to an increase of MFR during processing. This is valid for recycled polypropylene. However, the presence of an antioxidant does not lead to an increase in MFR similar to the effect discussed in the present invention. Furthermore, it is suitable to add an antioxidant in recycled material. This will decrease the effect of chain scissions counteracting the decrease in MFR imposed by the addition of silane group containing polyethylene. List of suitable phenolic antioxidants are Irganox 1010, Irganox B215, Irganox B225, Irganox E210, Songnox 1076, Songnox 1330 and Anox 20. List of suitable phosphite antioxidants are Irgafos 168, Songnox 1680, Songnox PQ and Alkanox 240. The preferred antioxidant is combination of Irganox 1010 and Irgafos 168. In one embodiment the invention is a process for controlling the $MFR_2$ of a recycled polypropylene composition (P) comprising:

a) at least 50 weight % of recycled polypropylene (A), and
b) 0.5 to 15 weight % of an ethylene copolymer (B) comprising hydrolysable silicon-containing groups comprising the steps of i) measure the $MFR_2$ of the recycled polypropylene (A)
ii) adding an ethylene copolymer (B) comprising hydrolysable silicon-containing groups
iii) compounding said recycled polypropylene composition (P), wherein the amount of ethylene copolymer (B) is based on the desired $MFR_2$ of the recycled polypropylene composition (P).

Measurement Methods

The melt flow rate ($MFR_2$) is determined according to ISO 1133 and is indicated in g/10 min. The $MFR_2$ is an indication of the flowability, and hence the processability, of the polymer. The higher the melt flow rate, the lower the viscosity of the polymer. The $MFR_2$ of polypropylene is determined at a temperature of 230° C. and a load of 2.16 kg, the $MFR_2$ of polyethylene is measured at a temperature 190° C. and a load of 2.16 kg a. All examples of compositions with at least 50 weight % of polypropylene are measured at 230° C.

Materials

EVS is LE-4423 is commercially available from *Borealis*. The EVS is a low-density polyethylene copolymer comprising hydrolysable silicon-containing groups. The copolymer is made in a high-pressure reactor. The density of the polymer is 923 $kg/m^3$ and it has an $MFR_2$ of 1.0 g/10 min.

Recycled polypropylene polymer 1 has an $MFR_2$ of 2.57 g/10 min. The polymer is obtained by collecting various plastic polypropylene articles. The polypropylene originates from a post-consumer process. The recycled polypropylene polymer 1 has a minor fraction of polyethylene.

Recycled polypropylene polymer 2 has an $MFR_2$ of 15.0 g/10 min. The polymer is obtained by collecting various polypropylene articles. The polypropylene originates from a post-consumer process. The recycled polypropylene polymer 2 has a minor fraction of polyethylene.

Recycled polypropylene polymer 3 (PP based thermoplastic olefin) has an $MFR_2$ of 2.4 g/10 min. The polymer is obtained by collecting various post-industrial polypropylene articles.

LDPE is FA3227 that is a commercially available. FA3227 is a low-density polyethylene with a density of 922 $kg/m^3$ and an $MFR_2$ of 0.3 gram/10 min.

Master batch of Irganox 1010 with 10 weight % of additive.

Masterbatch of Irgafos 168 with 10 weight % of additive.

EXAMPLES

The compositions as shown Table 1 were compounded on a 18 mm Axon extruder 25D with the temperature settings of 190, 220, 230, 230° C. The residence time is 1 minute and 20 seconds.

TABLE 1

| | Comp. example 1 | Comp. example 2 | Inventive example 1 | Inventive example 2 | Inventive example 3 | Comp. example 3 | Inventive example 4 |
|---|---|---|---|---|---|---|---|
| Recycled polypropylene polymer 1 [weight %] | 100 | 95 | 97.5 | 95 | 90 | | |
| Recycled polypropylene polymer 2 [weight %] | | | | | | 100 | 95 |
| LDPE [weight %] | | 5 | | | | | |
| EVS [weight %] | | | 2.5 | 5 | 10 | | 5 |
| $MFR_2$ [g/10 min] | 2.81 | 2.5 | 2.33 | 1.43 | 1.39 | 17.7 | 13.3 |
| Relative difference [+/− %] | +9% | −11% | −17% | −49% | −50% | −18% | −25% |

In comparative example 1 (comp. example 1) the recycled polypropylene polymer 1 is compounded and the $MFR_2$ after compounding is slightly increased. This is due to that the degradation of the polymer chains that occur in the compounder.

In comparative example 2 the recycled polypropylene polymer 1 is compounded together with a LDPE with low $MFR_2$. Note that the $MFR_2$ of LDPE and EVS are measured at 190° C. In the inventive example 1 the LDPE has been changed to EVS. The effect of decreased $MFR_2$ is higher even though half the amount of EVS has been added and that the EVS has higher $MFR_2$ than the LDPE. In inventive example 2 and 3 more EVS has been added. In inventive example 4 another recycled PP has been used. It shows that the invention works independent of the starting $MFR_2$ of the recycled PP.

The decrease of $MFR_2$ is higher with higher amount of EVS as shown in inventive example 2 and 3.

The relative difference is calculated as the ratio of $MFR_2$ of the recycled polypropylene composition (P) divided by $MFR_2$ of the recycled polypropylene (A) minus 100%.

The examples in Table 2 were compounded on a 18 mm Axon extruder 25D with different temperature settings:

Setting 1 of 170, 180, 190, 190° C.
Setting 2 of 190, 200, 210, 210° C.
Setting 3 of 210, 220, 230, 230° C.
Setting 4 of 230, 240, 250, 250° C.
Setting 5 of 250, 260, 270, 270° C.

TABLE 2

| | Inventive example 5 | Inventive example 6 | Inventive example 7 | Inventive example 8 | Inventive example 9 |
|---|---|---|---|---|---|
| Compounding settings | 1 | 2 | 3 | 4 | 5 |
| Recycled polypropylene polymer 1 [weight %] | 95 | 95 | 95 | 95 | 95 |
| EVS [weight %] | 5 | 5 | 5 | 5 | 5 |
| $MFR_2$ [g/10 min] | 1.99 | 1.63 | 1.43 | 1.15 | 1.42 |
| Relative difference [+/− %] | −23% | −37% | −44% | −55% | −45% |

In Table 2 the temperature setting of the compounder has been varied. An increased temperature setting decreases the $MFR_2$ of the recycled polypropylene composition (P). In inventive example 9 the decrease of the $MFR_2$ has stopped. The optimum occurs at 250° C. The temperature of the melt in the compounder has been verified by an external temperature device that has been temporarily inserted in the middle of the die of extruder.

In Table 3 a stabilizer has been added. The compositions were compounded on a 18 mm Axon extruder 25D with the temperature settings of 190, 220, 230, 230° ° C. The residence time of the melt is estimated to 1 minute and 20 seconds.

TABLE 3

| | Comparative example 1 | Comparative example 4 | Inventive example 10 |
|---|---|---|---|
| Recycled polypropylene polymer 1 [weight %] | 100 | 99 | 94 |
| Recycled polypropylene polymer 2 [weight %] | | | |
| MB Irganox 1010 [weight %] | | 0.5 | 0.5 |
| MB Irgafos 168 [weight %] | | 0.5 | 0.5 |
| EVS [weight %] | | | 5 |
| $MFR_2$ [g/10 min] | 2.81 | 2.80 | 1.32 |
| Relative difference [+/− %] | +9% | +9% | −53% |

The addition of additives did not change the $MFR_2$ as shown by the comparative example 4, but when adding additivities as in inventive example 9 the $MFR_2$ remains substantially the same compared to inventive example 2 without antioxidant additives.

In Table 4 examples of post-industrial polypropylene compositions are shown.

TABLE 4

| | Comparative example 5 | Inventive example 11 | Inventive example 12 | Inventive example 13 | Inventive example 14 | Inventive example 15 |
|---|---|---|---|---|---|---|
| Recycled polypropylene polymer 3 [weight %] | 100 | 99 | 98 | 97 | 96 | 95 |
| EVS [weight %] | | 1 | 2 | 3 | 4 | 5 |
| $MFR_2$ [g/10 min] | 2.43 | 1.43 | 1.37 | 0.89 | 0.32 | 0.25 |
| Relative difference [+/− %] | | −41% | −44% | −63% | −87% | −90% |

The change in $MFR_2$ has been measure on a post-industrial recycled polypropylene composition.

The invention claimed is:

1. A process of recycling a polypropylene composition, wherein the recycled polypropylene composition comprises:
   a) at least 50 weight % of recycled polypropylene, and
   b) 0.5 to 15 weight % of an ethylene copolymer comprising hydrolysable silicon-containing groups, compounding said recycled polypropylene composition, wherein the recycled polypropylene composition treated by 0.5 to 15 weight % of an ethylene copolymer comprising hydrolysable silicon-containing groups has at least 15% lower $MFR_2$ compared to the recycled polypropylene.

2. The process according to claim 1, wherein the recycled polypropylene composition is free from condensation catalyst.

3. The process according to claim 1, wherein the amount of recycled polypropylene is at least 75 weight %.

4. The process according to claim 1, wherein the amount of the copolymer comprising hydrolysable silicon-containing groups is from 2 to 10 weight %.

5. The process according to claim 1, wherein the compounding temperature is 230° C. or above.

6. The process according to claim 1, wherein the ethylene copolymer comprising hydrolysable silicon-containing groups is an LDPE.

7. The process according to claim 1, the copolymer comprising hydrolysable silicon-containing groups is a polyethylene that is grafted.

8. The process according to claim 1, wherein the process is free from peroxide and/or peroxide residues.

9. The process according to claim 1, wherein the copolymer comprising hydrolysable silicon-containing groups is free from peroxide or peroxide residues.

10. A recycled polypropylene composition, wherein the recycled polypropylene composition comprises:
    a) at least 50 weight % of recycled polypropylene, and
    b) 0.5 to 15 weight % of an ethylene copolymer comprising hydrolysable silicon-containing groups wherein said recycled polypropylene composition has been compounded, the polypropylene composition after the compounding having a $MFR_2$ of 0.5 to 5 g/10 min.

11. The recycled polypropylene composition according to claim 10, wherein the recycled polypropylene composition is free from condensation catalyst.

12. A process of modifying the $MFR_2$ of a recycled polypropylene, said process comprising the step of using an ethylene copolymer comprising hydrolysable silicon-containing groups as an $MFR_2$ modifier to provide a recycled polypropylene composition by compounding the recycled polypropylene with the ethylene copolymer comprising hydrolysable silicon-containing groups, wherein the recycled polypropylene composition comprises:
    A) at least 50 weight % of the recycled polypropylene, and
    b) 0.5 to 15 weight % of the ethylene copolymer comprising hydrolysable silicon-containing groups.

13. The process according to claim 12, wherein the recycled polypropylene composition is free from condensation catalyst.

* * * * *